Nov. 8, 1955  A. J. EDEN  2,722,961
TIRE CHAIN FASTENER
Filed May 11, 1953
Fig. 1.
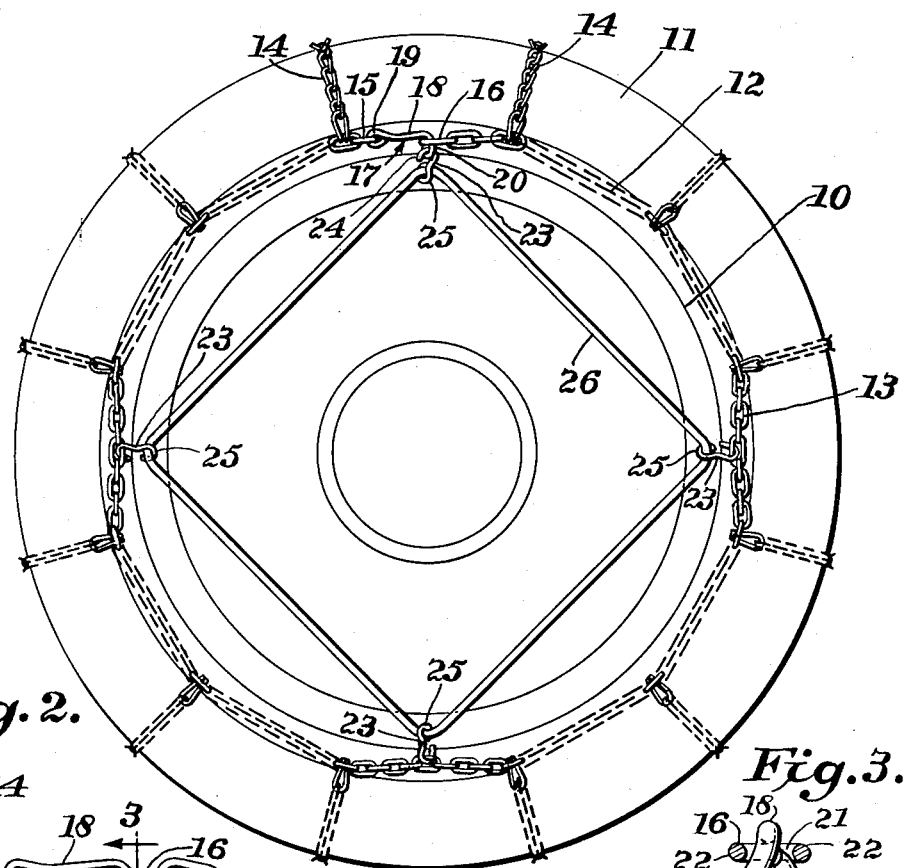
Fig. 2.
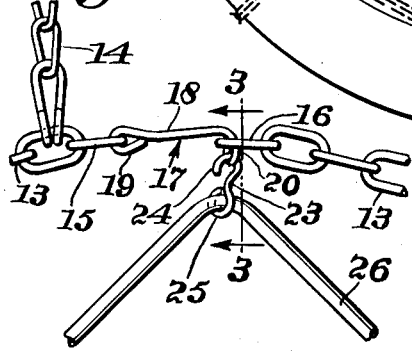
Fig. 3.
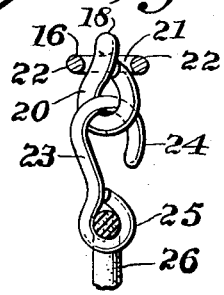
Fig. 4.
Fig. 5.
INVENTOR:
Albert Joseph Eden,
BY
ATTORNEYS.

United States Patent Office 2,722,961
Patented Nov. 8, 1955

2,722,961

TIRE CHAIN FASTENER

Albert J. Eden, Omaha, Nebr.

Application May 11, 1953, Serial No. 354,107

1 Claim. (Cl. 152—218)

The present invention relates to anti-skid tire chains and more particularly to an improved chain tightener for securely and firmly maintaining the chain in position on the tire when connected thereto.

An important object is to provide a simple, efficient and economical chain tightener that may be readily connected to one side of a chain at a minimum expenditure of time, labor and cost, so as to releasably maintain the chain on the tire.

A further object comprehends the provision of a chain tightener which is associated with a pair of spaced links. The tightener or connector includes an elongated stem having an eye at one end pivotally connected to one of the spaced links. The opposite end of the stem is provided with a depending loop or ring arranged to extend through the other of said spaced links so as to be detachably connected thereto, by a hook to which is also suitably connected an endless elastic member for maintaining and tensioning the chain on the tire when the parts are assembled. Preferably, the depending loop is wider than the adjacent link and is twisted or disposed at substantially right angles to the stem so that when inserted through the link and turned, it will provide a shouldered portion which engages the sides of the link to prevent accidental removal of the loop therefrom.

Other objects and advantages of the invention will become apparent from the following description when taken in conjunction with the accompanying claim and drawings.

Referring to the drawings in which are shown preferred embodiments of the invention:

Figure 1 is a side elevational view of a wheel and tire showing an anti-skid chain provided with the improved fastening means.

Figure 2 is a detail side view showing the fastener in its tightening or lock position.

Figure 3 is an enlarged sectional view taken substantially along the line 3—3 of Figure 2.

Figure 4 is a plan view of an endless elastic member arranged to be circumferentially connected at spaced points to the chain, and Figure 5 is a detail side view of a modified form of fastener, with parts of the chain in dotted lines.

Referring to the drawings, 10 indicates the rim of a vehicle wheel of any well-known and conventional type, and 11 a pneumatic tire which may be suitably connected to the rim. An anti-skid tire chain formed of a series of connected links is generally indicated by the numeral 12, and includes the spaced circumferentially disposed pair of chains 13 which are positioned on opposite sides of the tire 11 and which are connected at circumferentially spaced points by the cross chains 14. One of the side chains 13 is provided with the spaced end links 15 and 16 (Fig. 2) so as to facilitate the attaching of the chain 12 to the tire or the removal of the chain therefrom. A chain fastener or connector 17 preferably includes an elongated stem 18 which at one end has an eye or loop 19 (Fig. 2) that is pivotally connected to the adjacent link 15. The opposite end of the stem 17 is formed with a depending loop 20 which is of larger diameter than the elongated opening or space 21 (Fig. 3) between the side arms 22 of the link 16 so that the loop 20 must first be turned at right angles to the position shown in Figure 3, before it can pass through the opening 21. The loop then may be turned so as to assume the position as shown in Figure 3 in order to provide a shouldered abutment to prevent its accidental removal from the link 16.

The loop 20, when inserted through the link 16, is arranged to be detachably connected to a member 23 having at one end a hook 24 and its opposite end an eye 25. Three or more of the hook members 23 are circumferentially spaced around the wheel and, as shown for illustrative purposes, four of such members are detachably connected at spaced points to one side 13 of the chain and are also connected by the loops 25 to a retaining member 26 which preferably is in the form of an endless, elastic resilient flexible member or band that extends loosely through the loops 25 so as to be movable relative to the hooks when the parts are assembled. It will be seen that when the endless member is connected to the loop member, it will exert at all times a yieldable constraining force on the circumferentially spaced hook members 23 to insure proper positioning of the chain on the tire.

In the modified form of the invention shown in Figure 5, the fastener 27 is provided with a stem or body portion having at one end an eye 28 and at its opposite end a depending loop 29, which, instead of being turned or twisted at right angles to the stem 27, is in substantially the same vertical plane so that it may be inserted within a link opening such as 21 (Figure 3) and be locked or prevented from being removed therefrom when connected to a retaining hook member such as 23.

Thus it will be seen that means are provided for conveniently and quickly connecting an anti-skid chain to a tire or removing the chain from the tire at a minimum expenditure of time and labor. Additionally, the fastening member shown in Figure 3 constitutes a chain tightener which, when applied is prevented from accidentally being removed from the link 16 and thus constitutes a safety device which serves to lock the fastener to the spaced links 15 and 16 in the event the endless member 26 should break or other failures develop which would cause the fastener to be disconnected from the link 16. Additionally, by reason of the circumferentially spaced connection of the endless elastic member 26 with the adjacent side of the chain at three or more points, conveniently operable means are provided for not only maintaining the chain in a fixed position relative to the tire, but also which at the same time applies uniform tension to the chain so as to yieldably maintain the same firmly in position. It will be observed that due to the uniform and constant tension which is applied at circumferentially spaced points, any slack which is developed will be automatically taken up by the elastic member 26.

It will be understood that the form of the invention shown is merely illustrative of a preferred embodiment, and that such changes may be made as fall within the scope of the following claim.

I claim:

In a tire chain having an inner side chain, an outer side chain and circumferentially spaced cross chains, the outer side chain having longitudinally spaced links disposed between a pair of proximate cross chains, a fastener for releasably connecting said spaced links together, said fastener including an elongated stem having at one end an eye pivotally connected to one of said spaced links, the opposite end of said stem terminating in a depending loop arranged to extend loosely through the other of said spaced links and project outwardly from one side thereof, a hook member detachably connected to said depending loop, circumferentially spaced hook members connected to the outer side chain, said depending loop being positioned substantially at right angles to the stem and wider than its associated link so that when inserted therethrough and turned it is arranged to abut the sides of the link so as to prevent accidental withdrawal of the loop from the chain, and flexible means connected to said hook members for releasably maintaining the chain in a fixed position on the tire, the inward tension of said flexible means exerted on said fastener serving to move the spaced links towards each other to firmly maintain the chain on the tire.

References Cited in the file of this patent
UNITED STATES PATENTS

| | | |
|---|---|---|
| 1,072,285 | Wigley | Sept. 2, 1913 |
| 1,974,833 | Reyburn | Sept. 25, 1934 |
| 2,553,849 | Dines | May 22, 1951 |